March 31, 1931.  R. BRANDT  1,798,303
RIVETING MACHINE
Filed April 22, 1924
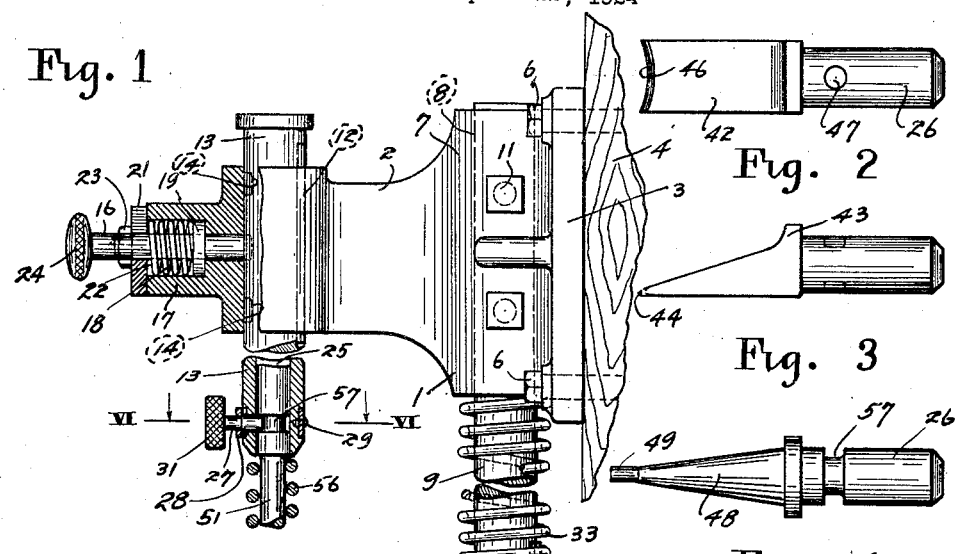
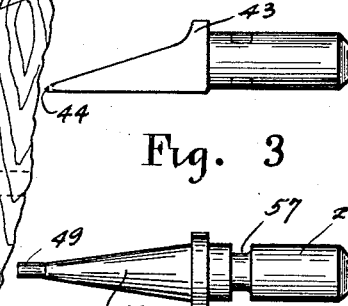
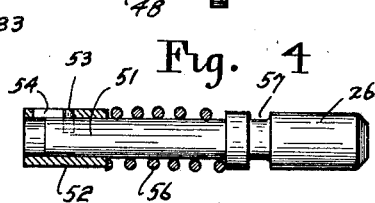
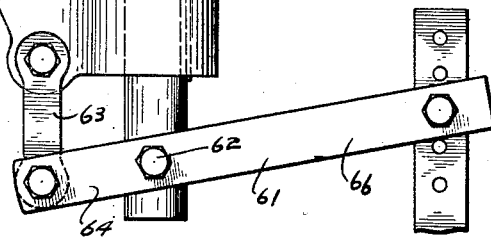
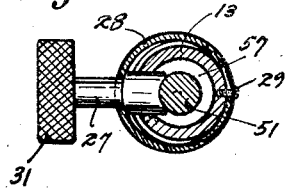
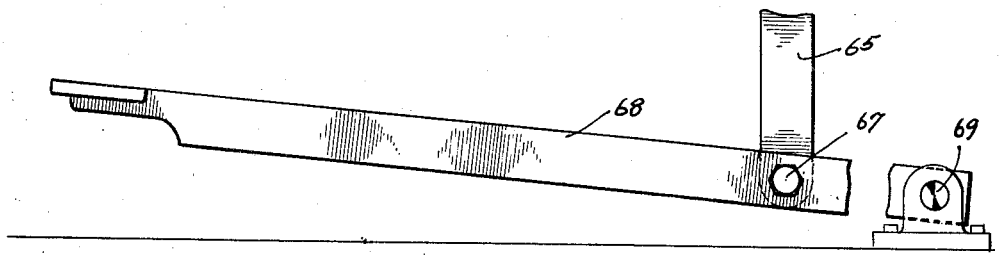
INVENTOR.
RUDOLPH BRANDT
BY
ATTORNEYS.

Patented Mar. 31, 1931

1,798,303

UNITED STATES PATENT OFFICE

RUDOLPH BRANDT, OF SAN FRANCISCO, CALIFORNIA, ASSIGNOR TO PETRY & BRANDT, OF SAN FRANCISCO, CALIFORNIA, A COPARTNERSHIP

RIVETING MACHINE

Application filed April 23, 1927. Serial No. 186,100.

The present invention relates to improvements in riveting machines and has particular reference to a riveting machine designed for use in connection with the riveting of brake bands. It is the particular object of the invention to provide a riveting machine by means of which a large plurality of rivets in a circular brake band for securing the lining thereto can be rapidly manipulated, the construction being such that the circular brake band can be conveniently introduced between two operative elements in reversed positions, according to whether the lining is on the inside or on the outside of the brake band.

It is further proposed to provide means in connection with the machine whereby the surrounding area of the lining is first pressed into firm contact with the brake band material before the squashing action is commenced.

It is further proposed to provide convenient means in connection with the machine for cutting off the heads of old rivets in a used brake band. It is further proposed to provide convenient means allowing for the rapid removal of the old rivets after the heads have been cut off. Further objects and advantages of my device will appear as the specification proceeds.

The preferred form of the invention is illustrated in the accompanying drawing, in which Figure 1 shows a side elevation of my machine, Figures 2 and 3 side views taken at right angles to one another of a rivet head cutting element, Figure 4 a side view of a punch for the removal of the rivets, Figure 5 a side view of an abutting element bearing on the end of the rivet during the squashing action, and Figure 6 an enlarged detail section taken along line VI—VI of Figure 1. While I have shown only the preferred form of the invention, I wish to have it understood that various changes or modifications may be made within the scope of the claims hereto attached without departing from the spirit of the invention.

My riveting machine (1) comprises a casting (2) consisting of a plate (3) adapted to be secured to a support (4) by means of bolts (6) and a supporting element (7) extending perpendicularly from the plate (3) and provided with a vertical perforation (8) near the plate allowing a vertical shaft (9) to be firmly held therein by means of bolts (11) and a second perforation (12) in the distant end of the supporting element running parallel to the perforation (8) allowing the holding member (13) to be received therein.

The latter holding member consists of a shaft provided with a plurality of recesses (14) in the circumference thereof adapted to receive the end of a pin (16) slidable transversely to the shaft in a lateral embossment (17) and forced into one of the recesses (14) by means of a spring (18) confined between a collar (19) on the pin and a cap (21) covering a recess (22) in the embossment, and held in place by means of bolts (23). A head (24) allows of the easy manipulation of the pin (16).

The shaft (13) is made hollow in the bottom end thereof as shown at (25) and is adapted to receive any one of a plurality of abutments illustrated in the Figures 2 to 5, all of which are formed with pins (26) adapted to be introduced into the shaft (13) and provided with recesses in the circumference thereof which may be engaged by the setting member (27) mounted radially in the hollow shaft (13) and forced into the recesses by means of an annular spring (28) secured to the outside of the shaft as shown at (29), while a head (31) allows of the easy withdrawal of the setting member from its engagement.

The shaft (9) which extends downwardly from the member (2) has a casting (32) slidable thereon with a spring (33) tending to force the casting (32) away from the upper structure. The latter casting presents a perforation (34) in alinement with the perforation (12) in the upper casting adapted to receive the sleeve (36), which latter is formed with a head (37) resting on the edge of the perforation (34). The upper face of this sleeve is curved to conform to the outlines of the circular brake band so that the latter may be placed on the same for the purpose of punching old rivets out of the band.

A pin (38) formed with a shoulder (39) may be introduced into the sleeve so that the shoulder rests on the edge thereof with a projection (41) extending upwardly from the pin for engagement with the head of the rivet to be operated on.

Of the abutments previously referred to, that shown in Figures 2 and 3 constitutes a means for cutting off the heads of old rivets. It comprises the pin (26) previously referred to and a blade (42) extending from the end thereof and forming a shoulder (43) with the same. The blade is tapered toward its extreme end to provide a cutting edge (44) which latter is preferably made concave as shown at (46) to insure a better engagement with the rivet to be cut. The pin (26) of this abutment is formed with two oppositely arranged recesses (47) for engagement with the setting member (27) which causes the blade to be held in one of two operative positions for cutting the rivet head.

The abutment shown in Figure 4 has a conical element (48) extending therefrom terminating in a cylindrical member (49) forming a punch for the removal of old rivets.

The abutment shown in Figure 5 comprises a cylindrical element (51) extending from the pin (26) having a sleeve (52) slidable thereon guided by a small pin (53) sliding in a slot (54) in the sleeve and normally held slightly in advance of the member (51) by means of a spring (56). Both abutments shown in Figures 4 and 5 are formed with annular grooves (57) for engagement with the setting member (27).

The casting (32) is actuated by means of a lever arrangement including a lever (61) pivoted to the lower end of the shaft (9) as shown at (62) and operatively connected with the casting by means of the short link (63) pivotally connecting the short arm (64) of the lever with the casting. The long arm (66) of the lever is pivotally connected by means of a link (65) with the fulcrum (67) of a foot operated lever (68) pivoted in the standards (69).

The device is preferably used as follows:

Assuming that the lining on a brake band has to be renewed, the first step is the removal of the old rivets. For this purpose the abutment shown in Figures 2 and 3 is introduced into the shaft (13) and secured by the setting member (27) in the manner described. The brake band having the old lining thereon is then placed on edge on the projection (41) for engagement of the cutting edge (46) with that portion of the shank of the rivet next to the head, whereupon the lever (68) is depressed by the foot of the operator, causing the head to be snapped off by the advance of the casting (32).

After all the heads have been cut off, the device is set for the punching operation by introducing the abutment shown in Figure 4 into the shaft (13) and by removing the pin (38) from the sleeve (36). By centering each rivet with the perforation in the sleeve (37) and depressing the lever (68) the rivets are punched out of the brake band in rapid succession.

The old lining may now be removed and the new lining put in place. The machine is re-set by the introduction of the abutment shown in Figure 5 into the shaft (13) and by the introduction of the pin (38) in the sliding casting (32).

The rivet is manually inserted in two registering holes in the brake band and in the lining, which latter has been previously prepared for this purpose, whereupon the head of the rivet is placed on the projection (41) with the point of the rivet extending toward the stationary abutment. A pressure on the lever (68) advances the rivet endwise toward the abutment for squashing action. But before the squashing action sets in, the sleeve (52) engages with that portion of the brake band surrounding the rivet and firmly presses the brake band against the lining so as to insure a firm union between the brake band and the lining.

As the advance of the casting (32) is continued, the sleeve (52) is forced upwardly against the spring (56) and the end of the rivet engages with the abutment for the formation of a second head on the rivet.

I claim:

1. A device of the type described comprising a reciprocal member, an abutment carried by said member and having a pin for entering the counter-sink portion of a brake band and for bearing on the head of a rivet and having a shoulder bearing on the margin of the counter-sink, and a second shoulder for bearing against the surface of the brake band, a second abutment, means for supporting said second abutment in alignment with the first abutment, said second abutment having a shank for squashing one end of a rivet, a sleeve slidably mounted on said shank, means for limiting the movement of said sleeve with respect to said shank, and spring means for yieldingly holding said sleeve in one position, said sleeve being adapted to initially enclose the rivet and bear against the brake band for holding the brake lining in contact with the metal band prior to the squashing action.

2. In a device of the type described, two members, one movable toward and away from the other, and being spaced far enough apart for receiving a brake band disposed on its edge, a manually actuated leverage mechanism with a fixed throw operatively connected to the movable member, a cylindrical shear die positioned in a bore in said movable member, a punch positioned in a bore in said shear die and projecting therefrom, a tool mounted on said other member, and means for adjusting said tool relative to said other member, whereby when the actuating leverage system moves the movable member through its predetermined distance the same force is exerted on the work whether the punch die is in place or not due to the compensating adjustment of the tool.

RUDOLPH BRANDT.